Jan. 27, 1959     M. B. CONRAD ET AL     2,870,841
APPARATUS FOR OPERATING SUBSURFACE WELL DEVICES
Filed July 25, 1952     5 Sheets-Sheet 1

MARTIN B. CONRAD,
JOHN R. BAKER,
INVENTORS.

BY
Mellin and Hanscom
ATTORNEYS

Martin B. Conrad,
John R. Baker,
INVENTORS.

BY
Mellin and Hanscom
ATTORNEYS

Jan. 27, 1959    M. B. CONRAD ET AL    2,870,841
APPARATUS FOR OPERATING SUBSURFACE WELL DEVICES
Filed July 25, 1952    5 Sheets-Sheet 4

MARTIN B. CONRAD,
JOHN R. BAKER,
INVENTORS.

BY
Mellin and Hanscom
ATTORNEYS

Jan. 27, 1959    M. B. CONRAD ET AL    2,870,841
APPARATUS FOR OPERATING SUBSURFACE WELL DEVICES
Filed July 25, 1952    5 Sheets-Sheet 5

MARTIN B. CONRAD,
JOHN R. BAKER,
INVENTOR.

BY
Mellin and Hanscom
ATTORNEYS

United States Patent Office 2,870,841
Patented Jan. 27, 1959

2,870,841

APPARATUS FOR OPERATING SUBSURFACE WELL DEVICES

Martin B. Conrad, Downey, and John R. Baker, Pasadena, Calif., assignors to Baker Oil Tools, Inc., Los Angeles, Calif., a corporation of California Application July 25, 1952, Serial No. 300,902

10 Claims. (Cl. 166—63)

The present invention relates to well devices, and more particularly to subsurface apparatus for operating such devices when disposed in a well bore.

In certain types of apparatus disposed in a well bore, their operation is initiated or controlled by electrical devices which derive their current from a source disposed above ground, the current being transmitted to the apparatus in the well bore through a conductive cable. Where conductive cables are not available, the electrical devices cannot be used. Accordingly, one of the objects of the present invention is to supply current to the electrically actuatable devices in the well bore without the need for a conductive cable.

In a more limited sense, the current for operating the electric device is supplied from a source near the device itself, the flow of current being governed by a timing device. Thus, the apparatus is lowered in the well bore on any kind of wire line or cable, either an electric or non-electric line, the apparatus containing its own source of electrical energy, which is capable of functioning under the control of a timing device forming part of the apparatus. This latter device is preset to allow sufficient time to elapse for the apparatus to be lowered on the wire line to the desired location in the well bore, the timer initiating the supply of electric current for operating the electric device, in order for the desired operation in the well bore to be performed.

At times, circumstances require withdrawal of the apparatus from the well bore and its non-performance of the intended operation. However, insufficient time may remain for such withdrawal to occur. Accordingly, another object of the invention is to prevent operation of the apparatus at the will of the operator, despite the action of the timer in attempting to cause the apparatus to function.

A further object of the invention is to allow the timing device to cause electrical current to flow at the end of the preselected time interval, but to prevent passage of such current in sufficient quantity to the electric device for the purpose of operating the latter. Accordingly, the apparatus can be withdrawn from the well bore without its operation occurring.

Yet another object of the invention is to provide an improved apparatus embodying a timer device for controlling its operation, in which the elapsed time of the apparatus to function can be easily varied and preselected.

Still a further object of the invention is to provide an electric generator in subsurface well apparatus capable of generating sufficient current for operating the apparatus, in which actuation of the generator is controlled by a timing device.

Yet another object of the invention is to provide a spring motor for actuating an electric generator in subsurface well apparatus, in which actuation of the spring motor for the purpose of rotating the generator can be controlled by the operator.

Another object of the invention is to provide an electric generator in subsurface well apparatus to supply current for operating the apparatus, the generator being actuated at the end of a preselected time interval, passage of current from the generator to a device operable by such current being under the control of the operator. If the operator desires, the generated current can be short circuited or shunted around the device, which is, therefore, not operated.

This invention possesses many other advantages, and has other objects which may be made more clearly apparent from a consideration of several forms in which it may be embodied. Such forms are shown in the drawings accompanying and forming part of the present specification. These forms will now be described in detail, illustrating the general principles of the invention; but it is to be understood that such detailed description is not to be taken in a limiting sense, since the scope of the invention is best defined by the appended claims.

Referring to the drawings:

Fig. 4 is a cross-section taken along the line 4—4 on Fig. 2a;

Fig. 5 is a cross-section taken along the line 5—5 on Fig. 2a;

The apparatus illustrated in the drawings can be lowered through a well casing A disposed in a well bore B on the lower end of a wire line or cable C extending to the top of the hole. It is particularly illustrated in connection with a pressure setting assembly D for actuating a well device, such as a bridge plug or packer (not shown), that is to be set at a desired location in the well bore. The operation of the perssure setting assembly and the bridge plug is set forth in the application of Reuben C. Baker et al, Serial No. 1,845, filed January 12, 1948, for "Gas Operated Well Apparatus," now Patent No. 2,640,547, to which reference can be had for a detailed description.

The well packer or bridge plug referred to is set as a result of developing a gradually increasing pressure in a cylinder 10 which is attached to the packer or plug in a suitable manner. The cylinder includes a cylinder sleeve 11 threaded onto the lower end of an elongate head 12 that contains a pressure or combustion chamber 13 in which a power charge, railway flare or fusee 14 is contained. This power charge rests upon the upper end of a floating piston 15 that is adapted to transmit the force imposed upon it by the gas pressure in the combustion chamber 13 to a liquid 16, the pressure of the liquid then being transmitted to another piston (not shown), for the purpose of setting the bridge plug, or other well device in the well casing A, or in an open hole.

Ignition of the power charge 14, which contains its own source of oxygen, is obtained by firing a cartridge 17 disposed in a gun barrel 18 inserted in the upper end of the cylinder head 12, and threaded onto the lower end of a firing head 19, which is threadedly secured in the upper end of the cylinder head 12. The firing of the cartridge 17 produces a downwardly projected flame capable of igniting the upper end of the power charge 14, which then commences burning and develops a gas under a gradually increasing pressure within the combustion chamber 13, in order to force the floating piston 15 relatively downward in the cylinder 10.

As illustrated, the firing of the cartridge 17 is obtained by passing an electric current through a heating filament 20 disposed in the explosive charge of the cartridge 17. One end of this filament is grounded by connecting it to the case of the cartridge 17, which engages the gun barrel 18. The other end of the filament is connected to the depending central portion of a conductor plate 21, confined between upper and lower discs 22 of insulating material, the discs and the conductor plate being clamped to the upper end of the gun barrel 18 by a cap 23 threaded on the latter. Fluid leakage into the gun barrel 18 is prevented by a suitable gasket 24 at the upper end of the gun barrel engaging the lower insulating disc 22.

It is apparent that the insulating discs 22 prevent contact between the conductor plate 21 and the gun barrel 18 and cap 23; so as not to short circuit any current passing through the conductor plate to the filament 20.

The conductor plate 21 contacts the lower end of a pin 25 extending slidably through an insulator 26 secured to the firing head 19 by a suitable lock ring 27 threaded into the latter. This insulator engages an insulator sleeve 28 into which the upper end of the conductor pin 25 extends, the pin being urged downwardly, to maintain its lower end in contact with the conductor plate 21, by a conductive helical spring 29, whose upper end engages a connector pin 30 slidable in the insulating sleeve 28. The upper end of the conductor pin 30 engages a conductor head 31 threadedly secured within a conductive rod 32 extending upwardly through an insulating block 33 suitably secured within a timer and generator housing 34, whose lower end is threadedly attached to the upper portion of the firing head 19. The upper portion of the conductive rod 32 has a socket into which the lower portion of a connector plug 35 (Fig. 6) snugly fits, this connector plug being threaded onto a screw 36, to which one lead 37 from a generator 38 is attached. The other lead of the direct current generator 38 is in the form of a spring contact element 39 engaging the wall of the housing 34.

The generator is supported between an upper spring motor housing or casing 40 and a lower insulating disc 41, in which the connector plug screw 36 is threaded, this latter insulating disc resting upon a rubber bumper 42 supported on the insulating block 33.

The rubber bumper 42 acts as a shock absorber to limit and cushion downward movement of the mechanism contained within the housing 34. The spring housing or casing 40 and the insulating disc 41 are secured together, in longitudinal spaced relation, by a plurality of circumferentially spaced and longitudinally extending tie rods 43 whose upper ends may be threaded into the spring housing 40 and whose lower portions extend through an annular centering disc 44 and into the insulating disc 42. The lower heads 45 of the tie rods 43 engage the lower end of the insulating disc 41, and nuts 46 are threaded onto the rods 43 for engaging an upwardly facing surface of the insulating disc 41, thereby securely attaching the tie rods 43 to the latter.

Current is generated by rotating the direct current generator 38 which is confined between the spring housing 40 and the insulating disc 41. This generator includes an outer permanent magnet field formed by two longitudinally extending metallic segments 47 embracing longitudinally spaced annular permanent magnets 48. One end of each segment 47 is secured in contacting relation to one of the magnets 48 by a brass screw 49 extending through the segment and a transverse slot 50 in the magnet, the other end of each segment 47 being caused to snugly embrace the other magnet by a screw 51 extending through the segment and threaded into a brass ring 52.

Longitudinally spaced bearing members 53 are disposed within the segments 47 adjacent the magnets 48, there being an armature shaft 54 rotatably mounted in these bearings. This armature shaft carries an armature 55 whose windings are attached to a commutator 56, the commutator segments being insulated from the armature shaft 54 by a suitable ring 57 of insulating material. A pair of opposed carbon brushes 58 is urged against the commutator segments 56, one of the brushes being connected to the lead 37 running to the connector screw 36, and the other of the brushes being connected to the spring contact element 39 that engages the housing 34.

It is apparent that the permanent magnets 48 supply the necessary magnetic field, and that rotation of the armature shaft 54 and armature 55 results in the generation of a current which will pass through the lead 37 and connector plug 35 to the conductive rod 32 and head 31, from where the current will flow through the connector pin 30 (see Fig. 2c), conductor spring 29 and conductor pin 25 to the conductor plate 21, from whence it will flow to one end of the cartridge filament 20. Since the other end of this filament is grounded to the outer portions of the apparatus, the current will flow through such apparatus and up through the housing 34 to the spring contact element 39, and back to the generator. In this manner, the circuit through the cartridge filament 20 is completed, sufficient current being provided by the generator 38 to heat the filament 20 and cause detonation of the explosive material contained within the cartridge 17.

Figure 6:
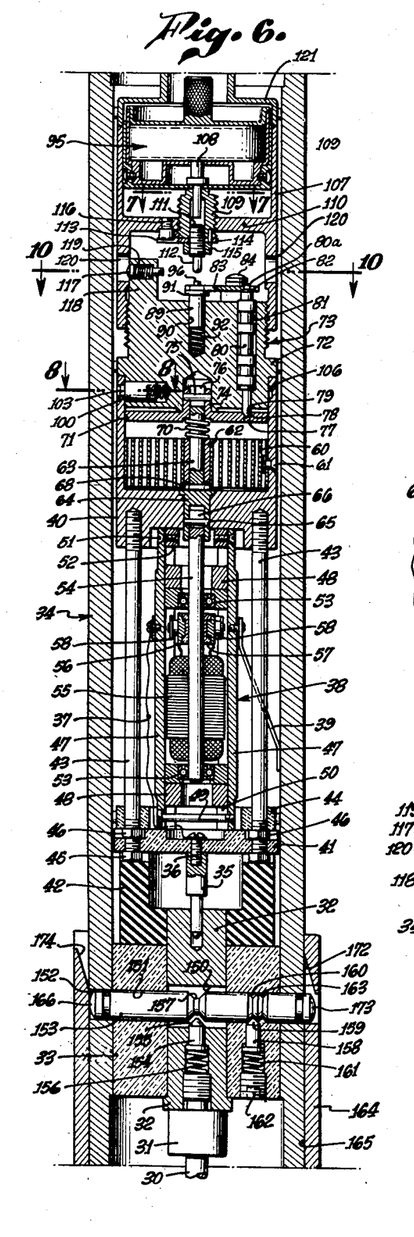
Fig. 6 is an enlarged sectional view through the timer, spring motor, generator and short circuiting switch portion of the apparatus, with the spring motor prevented from operating to rotate the generator.
Figure 7:
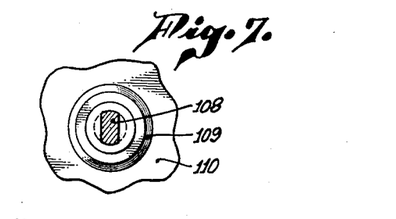
Fig. 7 is an enlarged cross-section taken along the line 7—7 on Fig. 6.
Figure 9:
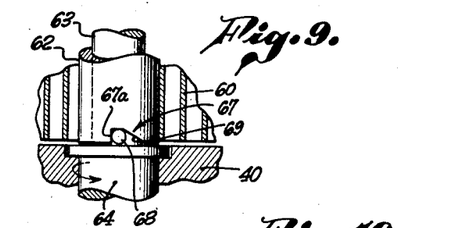
Fig. 9 is an enlarged fragmentary side elevation of the overrunning clutch portion of the spring motor.

The armature shaft 54, as shown in Fig. 6, is rotated by a spring motor confined within the spring housing 40. The outer end of a spiral spring 60 is secured to the housing by means of a rivet 61, the other, or inner, end of the spring being brazed, or otherwise suitably attached, to a driving clutch sleeve 62 surrounding a driven shaft 63 having an enlarged lower portion 64 rotatable in the spring housing or casing 40. This lower portion has a transverse coupling pin 65 secured thereto extending through a transverse slot 66 in the upper end of the armature shaft 54, which is piloted within the enlarged portion 64. The driving clutch sleeve 62 transmits its rotation to the driven shaft 63 and the armature shaft 54 through an overrunning or one-way clutch. The sleeve has diametrically opposed driving clutch teeth 67 (Fig. 9) that are engageable with a clutch pin 68 extending transversely through the driven shaft 63. The straight faces 67a of the teeth 67 engage the pin 68 to rotate it and the driven shaft 63, whereas the sleeve is also provided with tapered faces 69 which can be engaged by the pin 68 to shift the driving clutch sleeve 62 upwardly and disrupt the connection between it and the driven shaft 63. Such upward shifting occurs against the influence of a spring 70 encircling the upper end of the driven shaft 63, with its other end bearing upon a driven disc 71 through which the upper end of the driven shaft 63 extends. Then driven disc 71 is urged upwardly against the body portion 72 of a trigger or holding device 73 and has a hub portion 74 carrying a transversely extending pin 75 received within a transverse slot 76 in the driven shaft 63.

When the holding disc 71 is prevented from rotating, the driven shaft 63 and the armature shaft 54, as well as the driving clutch sleeve 62 of the spring motor, are also prevented from rotating. However, when the holding disc 71 is freed, then the spiral spring 60 can rotate the driven shaft 63 and the armature shaft 54, causing the generator to generate current for operating the heating filament 20 in the cartridge.

Initially, the spring motor is prevented from rotating the driven shaft and armature shaft by the detent device 73 that is releasable after a particular time interval has elapsed. Thus, the holding disc 71 has a longitudinally extending hole 77 therethrough whose upper sides 78 are tapered. The tapered lower end 79 of a release pin or detent 80 is receivable partly within this hole 77, the detent being slidable longitudinally in a bore 81 in the trigger body 72, the upper end of the pin extending above the latter. When the detent 80 occupies its lower position, with its lower end 79 disposed in the disc hole 77, the holding disc or lock plate 71 is prevented from rotating. Normally, the tendency of the spiral spring 60 to rotate the disc 71 urges the pin 80 in an upward direction, in view of the tapered surface 79 on its lower end. However, such upward movement is precluded by engagement of the tapered upper portion 82 of the pin with a trigger or latch plate 83 that is pivotally mounted on a fulcrum screw 84 threaded into the upper end of the trigger body 72. The urging of the pin or detent 80 in an upward direction by the holding disc 71 causes the upper end 82 of the detent to tend to swing the latch plate 83 to one side out of the way against the force provided by a coil spring 85 that is wound around the fulcrum screw 84. One arm 86 of the spring engages the latch plate 83, and tends to hold it in position upon the tapered end 82 of the detent pin 80. The other arm 87 of the spring is bent downwardly for reception within a hole 88 in the upper portion of the trigger body 72, in order to anchor the spring.

Figure 12:
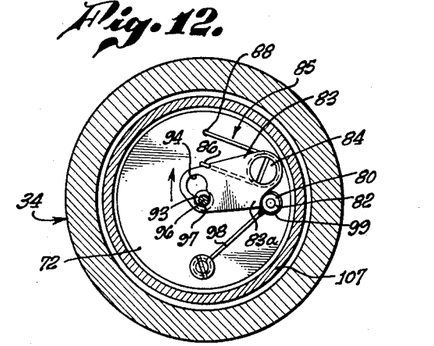
Fig. 12 is a cross-section taken along the line 12—12 on Fig. 11.

The latch plate 83 is prevented from being forced to one side by the release pin or detent 80 by a holding plunger 89 disposed in a central bore 90 in the trigger body 72, and having a flange 91 adapted to engage the upper end of the body. The plunger 89 is urged in an upward direction by a helical spring 92 engaging the base of the bore 90 and the lower end of the plunger. This spring 92 urges the plunger 89 upwardly, to dispose its cylindrical upper end 93 within a generally cylindrical hole 94 in the latch plate 83 (Fig. 12). When the upper end 93 of the plunger is disposed in this hole 94, the holding portion 83a of the plate 83 is disposed on top of the tapered end 82 of the release pin or detent 80, and precludes its removal from the tapered hole 77 in the spring motor lock plate 71. When the plunger 89 is shifted downwardly, to remove its upper end 93 from the hole 94, then the pin 80 is free to move upwardly to swing the latch plate 83 in a clockwise direction, as illustrated in Fig. 12, to allow the release pin 80 to shift upwardly out of holding engagement by the latch plate 83. The operation of a clock or timing device 95 shifts the plunger 89 out of the plate 83, to disposed a smaller end 96 of the plunger within the hole 94, this smaller end not interfering with shifting of the latch plate 83 to a detent releasing position, in view of a continuation of the plate hole 94 into a smaller hole 97, the plate 83 shifting over the upper end 93 of the plunger and coming to rest against the periphery of the small end 96, to limit the extent of swinging of the latch plate 83 under the influence of the release pin or detent 80.

One end of a spring arm 98 is anchored to the upper end of the trigger body 72 and has its opposite end 99 formed as a loop embracing the upper portion of the release pin or detent 80, tending to urge the latter downwardly against the holding disc or lock plate 71. However, despite such holding tendency, the lock plate 71 can shift the release pin 80 in an upward direction after the plunger 89 has been shifted downwardly, and the release pin 80 will be maintained in such upward position by the force of the spring 85 engaging the latch plate 83, urging its holding portion 83a against the periphery of the pin 80 (Fig. 12).

Figure 8:
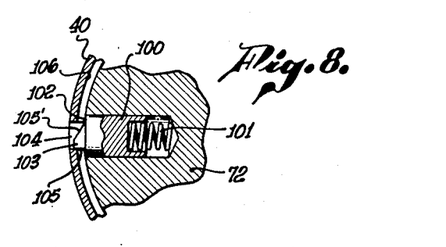
Fig. 8 is a fragmentary enlarged cross-section taken along the line 8—8 on Fig. 6.

The spring motor may be wound by rotating the trigger body 72 with respect to the spring housing 40. It is to be noted that the trigger body is piloted within the housing. This body carries a holding dog or pawl 100 slidable transversely in the body and urged in an outward direction by a helical spring 101. The holding dog 100 has an outer shoulder 102 engaging the inner surface of the spring housing 40, and from this shoulder a tooth 103 projects into holes 104 disposed circumferentially around the spring housing. The forward or driving face 105 of the tooth engages the side of the hole 104, in order to couple the trigger body 72 to the spring housing 40 and preclude unwinding of the motor spring 60 when the release pin 80 is coupled to the holding disc or lock plate 71. However, the opposite face 105 of the tooth or dog 103 is tapered, to allow rotation of the trigger body in the opposite direction (which will be in the clockwise direction illustrated in Fig. 8) to rotate the release pin 80, latch plate 71, driven shaft 63 and driving clutch sleeve 62 with respect to the spring housing 40, for the purpose of winding the spring 60. After the spring is wound to the desired extent, the tooth 103 will engage in one of the housing holes 104, to preclude its unwinding. It is also to be noted that the housing 40 has an annular groove 106 which is engaged by the top and bottom surfaces of the dog or tooth 103, to prevent longitudinal separation between the trigger body 72 and the housing 40.

As described above, the ability of the spring motor to function is dependent upon the downward shifting of the holding plunger 89 in the trigger body 72, to release it from the latch plate 83. Such downward shifting occurs at the end of a preselected time interval and as a result of the operation of a clock mechanism 95 of any suitable type, which is disclosed only diagrammatically in the drawings. This clock mechanism is contained within a timer case 107 threaded onto the upper portion of the trigger body 72. The clock has a rotatable driven shaft 108 slidably splined to a shaft 109 that is threaded in a partition wall 110 extending across the timer case 107. Threaded into the lower portion of the threaded shaft 109 is an adjusting screw 111 having a lower pin portion 112 adapted to engage the upper end of the holding plunger 89, and shift it downwardly with respect to the latch plate 83. The threaded shaft 109 is at first disposed in an upward position, such as illustrated in Fig. 6, the upper limit of threading being determined by engagement of an arm 113 extending from a plate 114 mounted on the adjusting screw 111 and clamped between the shaft 109 and a lock nut 115 threaded on the screw 111. The arm 113 of this plate engages a stop screw 116 when the threaded shaft 109 has been screwed upwardly in the timer case 107 to its initial position.

The clock shaft rotates at a predetermined speed, which ordinarily is relatively slow, and, upon rotating, will screw the threaded shaft 109 downwardly in the timer case until the end of the pin 112 engages the holding plunger 89 and shifts it downwardly to a position releasing the latch plate 83. The time that must elapse before the pin 112 so engages and releases the holding plunger 89 is determined by the initial gap or distance between the lower end of the pin 112 and the plunger 89. This initial gap or distance can be varied by varying the threaded position of the clock housing 107 on the trigger body 72. It is evident that the further the clock housing 107 is threaded on the trigger body 72, the closer the end of the pin 112 is placed to the upper end of the holding plunger 89. In addition, the time interval that must elapse before the pin engages the plunger can also be changed by the extent that the adjusting screw 111 is threaded into the threaded shaft 109.

Figure 10:
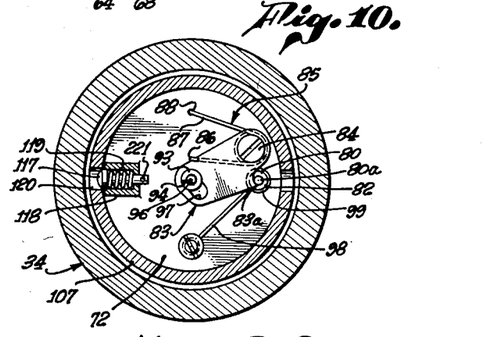
Fig. 10 is an enlarged cross-section taken along the line 10—10 on Fig. 6.
Figure 11:
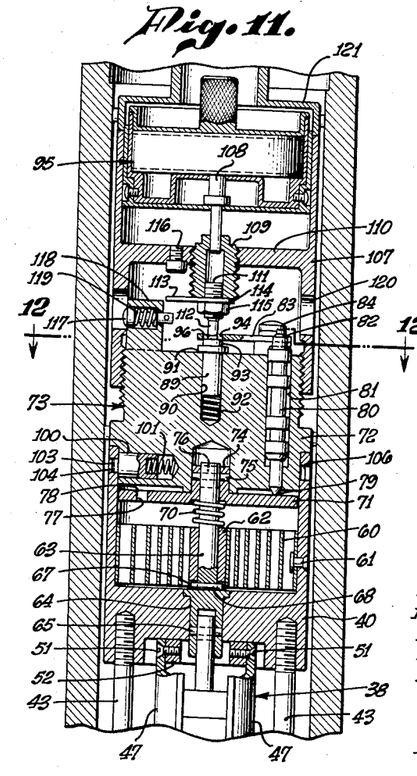
Fig. 11 is a view similar to Fig. 6, illustrating the spring motor after having been released for operation by the timer mechanism or clock.

The clock housing 107 is threaded to the predetermined desired extent on the trigger body 72, and is held in this threaded position by a plunger type of holding pawl or detent 117 that is slidable in an upper projection 118 of the trigger body, being urged outwardly by a helical spring 119 into one of a series of circumferentially spaced holes or recesses 120 in the clock housing 107. The extent of outward movement of the holding pawl 117 is limited by engagement of a transverse pin 221 (Fig. 10), secured to the holding pawl 117, with the inner surface of the body extension 118.

Figure 2A:
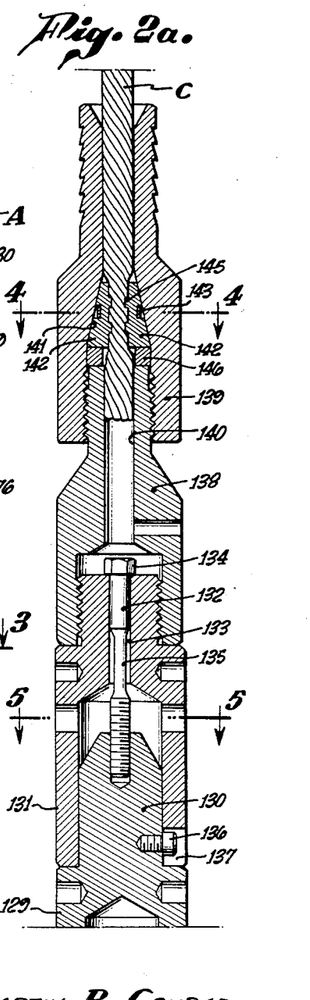
Figure 2B:
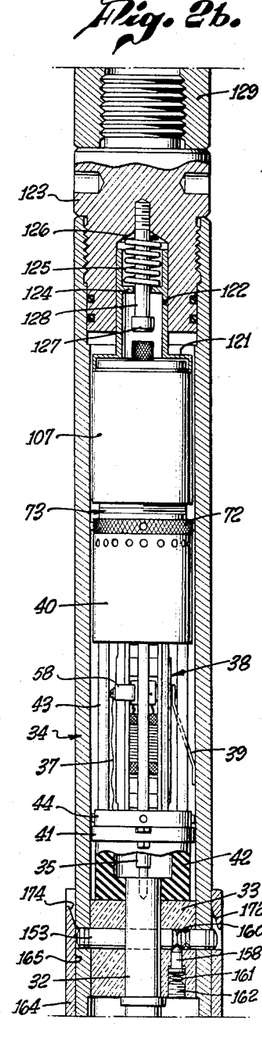

The timer case 107 is closed by a cap 121 (Fig. 2b) having a sleeve portion 122 projecting upwardly into a head 123 threaded into the upper end of the housing 34, in order to close the same. This sleeve 122 has an inwardly directed flange 124 that serves as a seat for a recoil spring 125 that engages the upper end of a socket 126 formed in the head. Movement of the entire clock mechanism in an upward direction occurs against the action of the spring 125, whereas downward movement is limited by engagement of the flange 124 of the timer clock case with the lower head 127 of a limit screw 128 extending upwardly through the flange 124 and spring 125 for threaded attachment to the head 123. As was stated above, the downward movement of the clock, spring motor and the generator mechanism is limited by the rubber bumper block 42.

The upper head 123 closing the housing 34 is threaded into a mandrel 129 that has an upward extension 130 projecting into a safety sleeve 131. This safety sleeve is secured to the mandrel by a safety cap screw 132 extending through a bore 133 in the upper portion of the sleeve 131 and threaded into the upper portion 130 of the mandrel. The head 134 of this cap screw engages the upper end of the sleeve 131, and its intermediate portion 135 is reduced in diameter to provide a weakened section at which the safety screw 132 can be disrupted in the event the apparatus becomes stuck in the hole, and it is desired to detach the wire line C therefrom. Rotation of the safety sleeve 131 with respect to the mandrel 129 is prevented by a cap screw 136 extending through a lower slot 137 in the safety sleeve and threaded into the upper portion 130 of the mandrel.

The upper portion of the safety sleeve 131 is threaded into a sub 138 which is, in turn, threaded into the body portion 139 of the rope or wire line socket. The lower end of the wire line C extends downwardly into this socket and into the bore 140 of the sub 138. The socket is provided with a frusto-conical bore 141 whose inner wall converges in an upward direction and in which a plurality of segmental slips 142 are disposed. These slips are maintained in alignment by a spring ring 143 disposed in an outer groove 144 therein, and they have wickers or teeth 145 adapted to engage or embed themselves in the exterior of the wire line C. The sub 138 is threaded into the socket body 139, with its upper end bearing against a washer 146, which, in turn, bears against the lower end of the slips 142. As the sub is threaded further into the socket body, the slips 142 are urged upwardly along the tapered surface of the body 141 and in an inward direction to maintain their wickers 145 embedded in the wire line.

In the use of an apparatus illustrated in the drawings, the parts are made up in the manner disclosed in Fig. 1 and Figs. 2a to 2c, inclusive. The spring 60 of the spring motor is previously wound appropriately by holding the spring housing 40 and rotating the trigger body 72, the release pin 80 coupling the disc 71 and the driven shaft 63 of the motor to the housing 72, so that such rotation, operating through the overrunning clutch 67, 68, rotates the driving clutch sleeve 62. When the spring 60 is wound, unwinding is precluded by engagement of the holding dog 103 in the recess or hole 104 in the spring housing or casing 40. At this time, the latch plate 83 occupies the position illustrated in Fig. 10, in which the upper end of the plunger 89 is located within the plate hole 94; to maintain the holding portion 83a of the plate 83 upon the upper tapered shoulder 82 of the release pin 80.

The clock housing 107 has also been appropriately threaded to the desired adjusted position along the trigger body 72, to provide the initial space between the lower end of the pin 112 on the threaded shaft 109 and the upper end of the holding plunger 89. This location of the clock housing is maintained by the detent 117 on the trigger body 72 engaging in one of the holes 120 in the clock housing.

The apparatus is lowered in the well casing to the desired point therein at which it is to be operated. When this point is reached, it is desired to pass current through the heating filament 20 of the cartridge 17. Such current will be transmitted upon rotation of the generator armature 55 by the spring motor. During the lowering of the apparatus in the well bore, the timer or clock 95 is rotating, gradually threading the shaft 109 downwardly within the clock housing 107, and causing the lower end of the pin 112 to approach the holding plunger 89. The clock mechanism is set to allow more than sufficient time for the apparatus to be lowered to the desired location in the well casing or bore. When such location is reached, and upon the clock 95 rotating the threaded shaft 109 sufficiently to cause the pin 112 attached thereto to shift the holding plunger 89 downwardly against the force of the spring 92, and out of the hole 94, the tendency of the spring 60 of the motor to unwind urges the release pin 80 upwardly, which, through its upper tapered shoulder 82, turns the latch plate 83 against the action of the return spring 85. When the plunger has been shifted by the clock screw shaft 109 out of the bore 94 in the latch plate 83, the upper tapered shoulder pin 82 moves the latch 83 out of the way, to the position illustrated in Fig. 12, which then allows the holding disc and plate 71 to shift the release pin 80 upwardly to a releasing position, the spring 85 acting on the latch plate 83 and causing it to bear against the cylindrical portion 80a of the pin above its tapered shoulder 82, to hold it in this elevated position.

The spiral spring 60 can then unwind, and operate through the one-way clutch 67, 68 to rotate the driven shaft 63 and the armature shaft 54 rather rapidly, of the order of several thousand revolutions per minute, causing a current to be generated which is transmitted through the lead 37 and the above-described various different conductive plugs and pins, and other elements, to the heating filament 20, the latter being heated and causing detonation of the explosive 17. The flame emanating from the cartridge 17 ignites the upper end of the power charge 14 and produces the evolution of gas under pressure which is effective in moving the floating piston 15 downwardly and operate the well device attached to the cylinder 10, as fully described in the patent application above referred to. When the spiral spring 60 becomes unwound, or is incapable of imposing further rotary effort to the armature shaft 54, the one-way clutch 67, 68 can overrun, to allow the armature shaft 54 to continue its rotation until it comes to rest. However, for purposes of properly operating the apparatus, it is only necessary to supply sufficient current to the heating filament 20 for a comparatively short period, inasmuch as upon increase of the temperature of the filament to the desired degree the explosive 17 will detonate, thereby rendering the further supply of current unnecessary.

In the event the apparatus becomes stuck in the hole, a strain can be taken on the wire line C which will be transmitted through the safety cap screw 132 to the mandrel 129. A sufficient pull will disrupt the safety screw 132 at its reduced diameter portion 135, allowing the wire line C, safety sleeve 13, sub 138 and rope socket body 139 to be withdrawn to the top of the well bore.

The apparatus is operated after a predetermined time has elapsed. As stated above, such time is selected to afford ample opportunity for the lowering of the apparatus in the well bore to the desired location at which it is to be operated. However, at times it may be necessary or desirable to remove the apparatus from the well bore without the generator 38 discharging the cartridge 17. Sufficient time may not elapse to remove the apparatus from the well bore. For this reason, a device is incorporated in the apparatus that can readily nullify the action of the timing mechanism and generator, in the event the apparatus is not to be operated, and is to be withdrawn from the well bore or casing.

The above objective is obtained by short circuiting the generator current around the heating filament 20, allowing substantially no current to pass from the generator to the latter. Ordinarily, the filament 20 is the only electrical device connected across the generator brushes 58, the current passing from one generator brush through the lead 37 to the connector plug 35, and from such plug through the rod 32 and conductor head 31 to the connector pin 30, from where it flows through the conductor spring 29 and pin 25 to the conductor plate 21 attached to the filament 20. The other end of the filament is connected to the casing or outer portion 18, 19, 34 of the apparatus, flowing through such portions and from the housing 34 through the spring contact element 39 back to the other brush 58 of the generator, to complete the circuit.

The foregoing circuit, however, can be short circuited by allowing the current to flow through a parallel path of substantially lesser resistance. Thus, as disclosed in the drawings, and perhaps most clearly in Fig. 6, the conductive rod 32, which extends through the insulating block 33, has a transverse bore 150 therethrough in alignment with a transverse bore 151 extending through the conductor block, which communicates with coaxial transverse bores or holes 152 through the housing 34. A generally cylindrical switch rod 153 is slidable transversely through these aligned bores, the diameter of the bore 150 through the conductive rod 32 being substantially greater than the outside diameter of the switch rod 153; so that there is no connection or contact between these two rods, the current normally flowing through the conductive rod 32 without passing through the switch rod 153.

When the current is to be allowed to pass through a switch rod 153, the latter is caused to engage a short circuiting plunger 154 slidable longitudinally along the axis of the conductive rod 32, and having an upper tapered end 155 adapted to engage the switch rod 153. The plunger 154 is urged in an upward direction toward an engaging position with the switch rod 153 by a helical spring 156 bearing against the underside of the plunger 154 and resting against the inner portion of the conductor head 31. The tapered end 155 of the short circuiting plunger 154 extends inwardly to a sufficient extent to engage the periphery of the switch rod 153. However, such engagement cannot occur during normal use of the apparatus, since the tapered plunger end 155 is disposed within a circumferential groove or recess 157 formed in the switch rod, the tapered end of the short circuited plunger being incapable of engaging the rod, as illustrated in Fig. 6.

The switch rod 153 is maintained in this position by a detent in the form of a longitudinally slidable plunger 158 mounted in the insulating block 33, the upper tapered end 159 of the plunger being received within a circumferential groove 160 in the rod 153, and being urged toward a position within this groove by a spring 161 engaging the lower end of the plunger 158 and resting upon a screw 162 threaded into the lower end of the insulating block 33.

Figure 13:
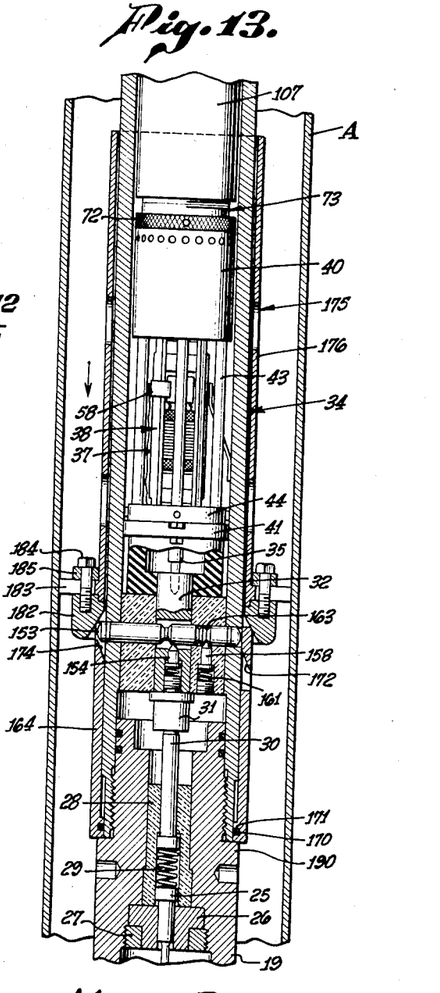
Fig. 13 is a view similar to Fig. 2b, but illustrating the circuit from the generator short circuited, to avoid actuation of the device to which current is to be supplied by the generator.

When the current in the generator is to be short circuited or shunted around the cartridge filament 20, the plunger 153 is shifted transversely of the apparatus, or to the left, as disclosed in Figs. 6 and 13, so that the cylindrical periphery of the rod 153 is caused to engage the short circuiting plunger 154, the detent 158 then being disposed in another circumferential groove 163, as shown in Fig. 13, to hold the switch rod 153 in its short circuiting position. When this occurs, current can then pass from the conductive rod 32 through the switch rod 153 to the housing 34 of the apparatus, and then through the spring contact element 39 back to the generator, substantially no current passing to the filament 20 upon rotation of the generator by the spring motor.

Figure 2C:
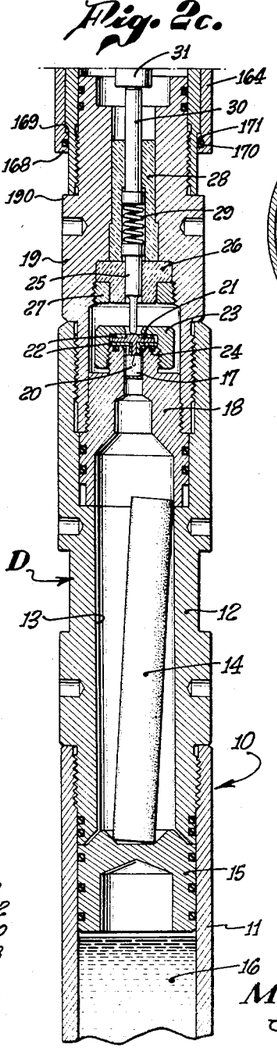
Figure 3:
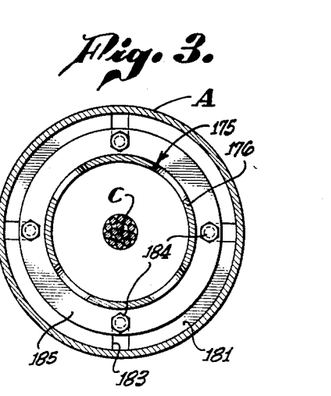
Fig. 3 is a cross-section taken along the line 3—3 on Fig. 2.
Figure 4:
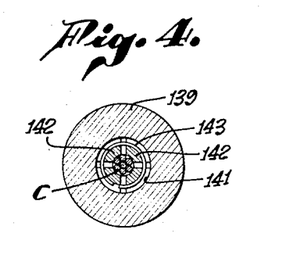
Figure 5:
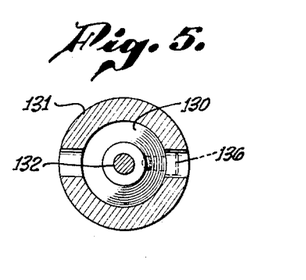

The operation of the safety switch rod 153 in the manner described above is performed by shifting a sleeve 164 along the exterior of the housing 34. This sleeve is provided with a cylindrical inner surface 165 which initially engages one head 166 of the safety switch rod, holding it in the position disclosed in Fig. 6, in which the detent 158 secures the rod 153 in such position that the short circuiting plunger 154 cannot engage it. When in this position, the generator current will pass through the cartridge filament 20. This position is determined by engagement of an inwardly directed flange or shoulder 168 on the sleeve with a companion shoulder 169 formed on the housing 34 (Fig. 2c). The sleeve itself is maintained in such elevated position by any suitable device, as, for example, by providing an elastic or rubber O ring 170 in a groove 171 in the sleeve engaging the periphery of the housing 34, in order to provide enough friction therebetween to hold the sleeve in its upward position.

When the switch rod 153 is to be shifted to its short circuiting position, the sleeve 164 is moved downwardly along the housing 34, an upper cam face 172 on the sleeve engaging the opposite head 173 of the switch rod to shift it to the left, as disclosed in the drawings, or to the position illustrated in Fig. 13. Such shifting is permitted since the sleeve 164 has a cut away portion 174 at the left end of the rod to permit the latter to move to the left under the influence of the tapered cam face 172 of the sleeve at the opposite side thereof. The shifting continues until the detent 158 engages the other groove 162 of the plunger 153, to hold it in the short circuiting position, thereby insuring that the current developed by the generator will not pass through the heating filament 20 when the spring motor is released for operation.

Figures 1, 2:
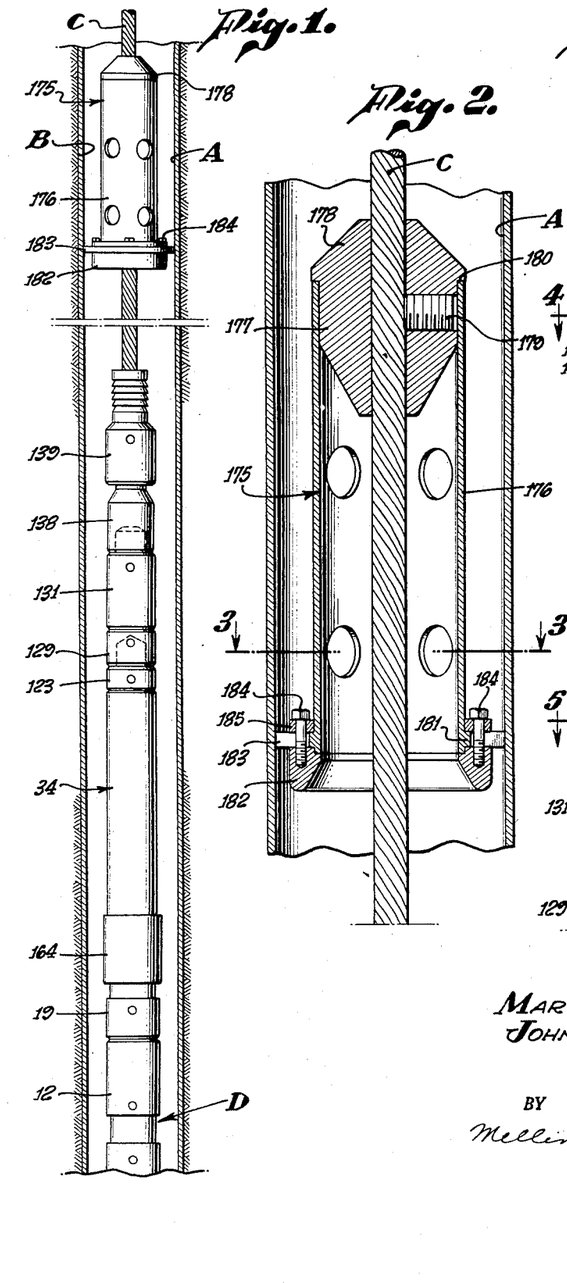
Figure 1 is a side elevation, on a reduced scale, of apparatus embodying the invention, disposed in a well casing located in a bore hole.
Figs. 2, 2a, 2b and 2c together constitute a longitudinal section through the well apparatus illustrated in Fig. 1 on a greater scale, Fig. 2a forming a lower continuation of Fig. 2, Fig. 2b constituting a lower continuation of Fig. 2a, and Fig. 2c constituting a lower continuation of Fig. 2b.

The sleeve is shifted downwardly by a friction drag device 175, which is initially maintained in an elevated position on the wire line C at some distance above the apparatus (Figs. 1, 2, 13). As an example, the drag device may be located fifty feet above the body 139 of the rope socket, to preclude its inadvertent shifting into a position to shift the sleeve 164 downwardly, and thereby move the switch rod 153 to its short circuiting position. The drag device includes a sleeve 176, which is preferably perforated, slidably mounted on the cylindrical portion 177 of a head 178 that is attached to the wire or sand line C in any suitable manner, as by means of a set screw 179 threaded transversely through the head and engaging the wire line. The upper end of the perforated sleeve 176 engages a stop shoulder 180 on the head to limit the extent of upward movement of the sleeve 176 along the head.

The lower portion of the sleeve 176 is provided with a flange 181 against which a lower guide 182 abuts. Disposed on this guide is an annular friction disc 183, clamped to the latter by a plurality of cap screws 184 passing through a retainer ring 185 engaging the upper side of the flange 181, and extending through the friction disc for threaded reception within the guide 182. The friction disc 183 frictionally engages the inner wall of the well casing A. During downward movement of the apparatus within the well casing, the drag device 175 and its perforated sleeve 176 tend to remain in an upward position, or disposed on the cylindrical portion 177 of the head 178, with its upper end in engagement with the stop shoulder 180.

Following lowering of the apparatus in the well casing, in the event it is desired to render the apparatus inoperative, to permit its withdrawal from the well bore before the timer mechanism allows the spring motor to rotate the generator, and thereby supply current to the heating filament 20, the wire line C need merely be elevated a sufficient extent, which, in the example given, is about fifty feet, the drag device 175 remaining in its position in the casing A by virtue of its frictional engagement with the wall of the latter, the wire line head 178 merely pulling out of the upper end of the sleeve of the drag device. Upon elevation of the wire line to the sufficient extent, the apparatus is pulled upwardly within the sleeve 176, the inside diameter of the sleeve being sufficient to allow the housing 34 of the apparatus and all of the mechanism thereabove to pass thereinto and therethrough. The safety switch actuating sleeve 164, however, does not have a sufficient diameter to permit this action to occur. The upper end of the safety sleeve 164 will engage the guide 182 of the drag device and, upon continued upward movement of the housing 34, the safety sleeve 164 will be shifted downwardly relative to the housing 34, to shift the switch rod 153 to the left, or to the short circuiting position illustrated in Fig. 13. The downward movement of the safety sleeve 164 to the extent indicated is limited by engagement of its lower end with a shoulder 190 provided on the firing head 19, whereupon a continuation of the upward movement of the wire line C of the apparatus will carry the drag device 175 upwardly with it along the casing A.

Since the switch 153 is now in a short circuiting position, the elapsing of the preselected time for the pin 112 to release the holding plunger 89, and thereby allow the release pin 80 to be shifted from holding engagement in the holding disc 71, to enable the spring motor to rotate the generator, will have no effect in firing the explosive in the cartridge 17, since the current developed as a result of rotation of the generator armature will be short circuited through the switch plunger 153, in the manner described above. Accordingly, the apparatus will be rendered inoperable for the performance of the desired operation of the well bore and may be withdrawn to the top of the hole without fear of the apparatus being actuated.

Of course, the apparatus can be lowered in the well casing without the short circuiting switch 153 being operated at all. For that matter, it may be raised and lowered, if desired, as in causing the apparatus to pass through minor restrictions in the well casing or well bore without actuating the short circuiting switch, so long as the apparatus is not moved upwardly the distance necessary to cause the housing 34 to move within the drag device 175, and enable the latter to shift the actuator sleeve 164 relatively downward along the housing to short circuiting position. It is only when the device is to be removed from the hole without operating it that the wire line C and the apparatus are shifted upwardly the desired distance to cause the drag device 175 to short circuit the generator.

Figure 14:
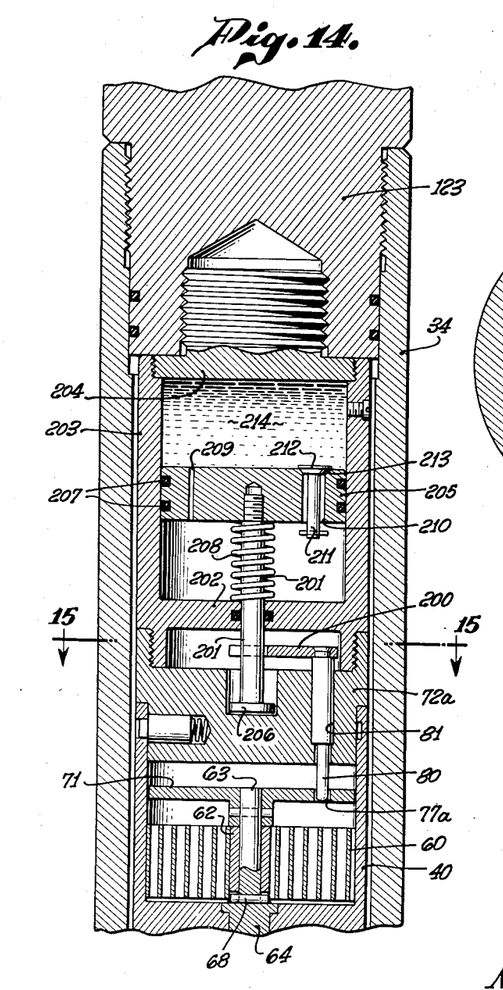
Fig. 14 is a longitudinal section through another embodiment of the invention.
Figure 15:
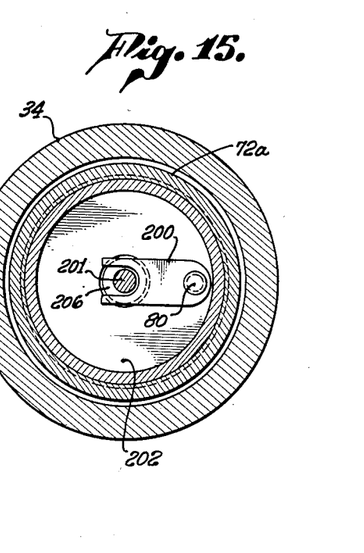
Fig. 15 is a cross-section taken along the line 15—15 on Fig. 14.

In the modified form of apparatus disclosed in Figs. 14 and 15, a hydraulic timing device is disclosed for releasing the spring motor, rather than the mechanical clock device heretofore described. Thus, the trigger body 72a is piloted within the spring motor housing 40 in the same manner as before, the release pin 80 extending through a bore 81 in the body, and through a cylindrical hole 77a in the spring motor holding disc 71. The upper end of the release pin 80 is secured to a yoke 200 through which a piston rod 201 extends. This piston rod is slidable through the lower head 202 of a cylinder 203 that is threaded into the trigger body, the upper end of the cylinder being enclosed by a suitable cylinder head 204, which takes the place of the timer clock housing 107 and the cap sleeve 121 illustrated in the other form of the invention. A piston 205 is slidable in the cylinder 203 and is secured to the rod 201, the lower end of the rod having a flange 206 thereon adapted to engage the release pin yoke 200.

The piston has suitable rings or side seals 207 slidably engaging the wall of the cylinder 203 to prevent leakage therethrough, and is normally urged in an upward direction by a helical compression spring 208 having its lower end bearing upon the lower cylinder head 202 and its upper end against the piston 205. The piston has a comparatively small diameter orifice 209 extending therethrough from its head end to its rod end, and is also provided with a much larger passage 210 therethrough normally closed by a one-way valve 211 having its head 212 movable downwardly into engagement with a companion seat 213 in the piston to prevent flow of fluid in a downward direction through the enlarged passage 210. However, fluid can flow freely in the opposite or upward direction through this passage 210.

The piston 205 normally occupies a lower position in the cylinder 203 with the piston flange 206 disposed a predetermined distance below the pin yoke 200. The rod side of the piston 205 initially is devoid of any liquid, but the cylinder on the other side of the piston is completely filled with liquid 214. The spring 208 urges the piston in an upward direction, but such upward movement of the piston 205 and its rod 201 can only occur as liquid moves through the small diameter orifice 209 to the rod side of the piston. The size of the orifice 209 is so chosen that fluid can only pass therethrough at a comparatively slow rate. The orifice area is chosen to enable sufficient time to elapse for the apparatus to be lowered in the well casing A to the location at which the desired operation is to take place. As the liquid passes through the small diameter orifice 209, as a result of the piston 205 moving upwardly in the cylinder, the piston rod flange 206 approaches the yoke 200, and eventually will engage the latter and lift it to move the release pin 80 out of the holding disc hole 77a, thereby freeing the spring motor for its rotation of the generator armature, in order to generate sufficient current for heating the cartridge filament 20.

When it is desired to reset the hydraulic timing apparatus for the occurrence of another operation, after the equipment has been withdrawn from the well casing, the piston 205 need merely be shifted downwardly against the force of the spring 208, the fluid being enabled to flow readily through the large piston passage 210, automatically unseating the valve head 212 from its companion seat 213 in the piston 205, to allow such flow to occur. However, any tendency for the fluid to flow through this passage in the reverse direction is prevented by engagement of the valve head 212 with the piston seat 213.

The inventors claim:

1. In subsurface well apparatus adapted to be lowered in a well bore on a running-in string: an electrically operable device; a generator; a circuit electrically connecting said generator to said device; a motor drivably connected to said generator to rotate the same; means including a timing device operatively connected to said motor for effecting its operation after a predetermined period has elapsed; and means controlled by the operator at the top of the well bore for short circuiting said circuit at all depths in the well bore.

2. In subsurface well apparatus adapted to be lowered in a well bore on a running-in string: an electrically operable device; a generator; a normally closed circuit electrically connecting said generator to said device; a motor drivably connected to said generator to rotate the same; means for controlling operation of said motor; and means controlled by the operator at the top of the well bore for short circuiting said circuit at all depths in the well bore.

3. In subsurface well apparatus adapted to be lowered in a well bore on a running-in string: an electrically operable device; a generator; a normally closed circuit electrically connecting said generator to said device; a motor drivably connected to said generator to rotate the same; means for controlling operation of said motor; and means including instrumentalities movable longitudinally in the well bore with respect to the running-in string for short circuiting said circuit at all depths in the well bore.

4. In subsurface well apparatus adapted to be lowered in a well bore on a running-in string: an electrically operable device; a housing connected to said device; a generator in said housing; a normally closed circuit connecting said generator to said device; a motor in said housing drivably connected to said generator to rotate the same; means for controlling the operation of said motor; a switch for short circuiting said circuit; and means controlled by the operator at the top of the well bore for operating said switch at all depths in the well bore.

5. In subsurface well apparatus adapted to be lowered in a well bore on a running-in string: an electrically operable device; a housing connected to said device; a generator in said housing; a circuit connecting said generator to said device; a motor in said housing drivably connected to said generator to rotate the same; means for controlling the operation of said motor; a switch for short circuiting said circuit; a sleeve slidable on said housing for operating said switch; and friction drag means movable longitudinally with respect to said housing into engagement with said sleeve to shift said sleeve along said housing.

6. In subsurface well apparatus adapted to be lowered in a well bore on a running-in string: an electrically operable device; a generator; a normally closed circuit electrically connecting said generator to said device; a spring motor; means including an overrunning clutch drivably connecting said motor to said generator to rotate the latter; releasable holding means engaging said motor to prevent its operation; and means engageable with said holding means to release said holding means and allow said motor to rotate.

7. In subsurface well apparatus adapted to be lowered in a well bore on a running-in string: an electrically operable device; a generator; a normally closed circuit electrically connecting said generator to said device; a spring motor drivably connected to said generator to rotate the same; releasable holding means engaging said motor to prevent its operation; and a timing device operatively engageable with said holding means to release said holding means, said timing device comprising a threaded member initially spaced from said holding means and rotatable for feeding into engagement with said holding means to release the latter.

8. In subsurface well apparatus adapted to be lowered in a well bore on a running-in string: an electrically operable device; a generator; a normally closed circuit electrically connecting said generator to said device; a spring motor drivably connected to said generator to rotate the same; releasable holding means engaging said motor to prevent its operation; a timing device operatively engageable with said holding means to release said holding means, said timing device comprising a threaded member initially spaced from said holding means and rotatable for feeding into engagement with said holding means to release the latter, and means for adjusting the initial space between said threaded member and holding means.

9. In subsurface well apparatus adapted to be lowered in a well bore: an electrically operable device; a housing connected to said device; a generator in said housing; a circuit connecting said generator to said device; a motor in said housing drivably connected to said generator to rotate the same; means for controlling the operation of said motor; means for short circuiting said circuit; a wire line connected to said housing; a stop member secured to said wire line substantially above said housing; a friction drag device around said wire line engaging said stop member during lowering of the apparatus in the well bore and movable longitudinally downward with respect to said wire line and housing, upon elevation of said wire line and housing, into engagement with said short circuiting means to actuate the same.

10. In subsurface well apparatus adapted to be lowered in a well bore on a wire line: an electrically operable device; a motor generator set; a normally closed circuit electrically connecting said motor generator set to said device; a switch for short circuiting said circuit; a stop member secured to said wire line, and a friction drag device around said wire line engaging said stop member during lowering of the apparatus in the well bore and movable longitudinally downward with respect to said wire line, during elevation of said wire line, into engagement with said switch to actuate the same.

References Cited in the file of this patent

UNITED STATES PATENTS

| | | |
|---|---|---|
| 1,084,420 | Fritzgerald | Jan. 13, 1914 |
| 1,507,768 | Collins | Sept. 9, 1924 |
| 2,103,475 | Lindsly | Dec. 28, 1937 |
| 2,147,983 | Lindsly | Feb. 21, 1939 |
| 2,192,542 | Benedetti | Mar. 5, 1940 |
| 2,327,340 | Couch | Aug. 24, 1943 |
| 2,327,362 | McDonald et al. | Aug. 24, 1943 |
| 2,494,256 | Muskat | Jan. 10, 1950 |
| 2,621,732 | Ahlgren | Dec. 16, 1952 |

FOREIGN PATENTS

| | | |
|---|---|---|
| 468,169 | Great Britain | June 30, 1937 |